No. 775,000. PATENTED NOV. 15, 1904.
A. E. E. BREARD.
OBJECTIVE FOR KINEMATOGRAPHIC OR LIKE PROJECTIONS.
APPLICATION FILED FEB. 26, 1903.
NO MODEL. 3 SHEETS—SHEET 1.
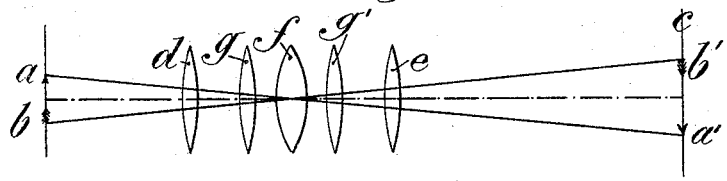
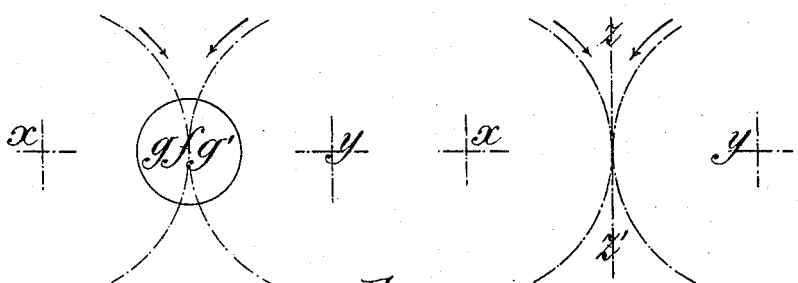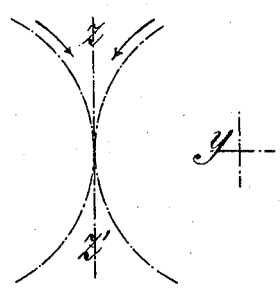
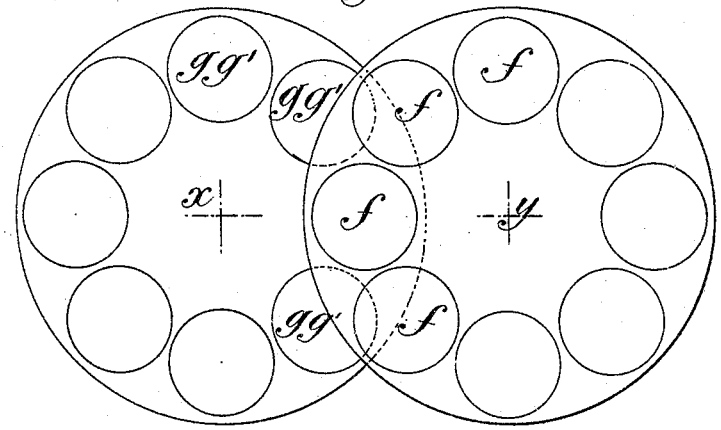
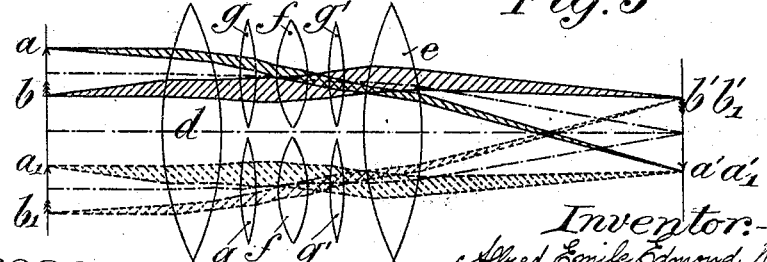

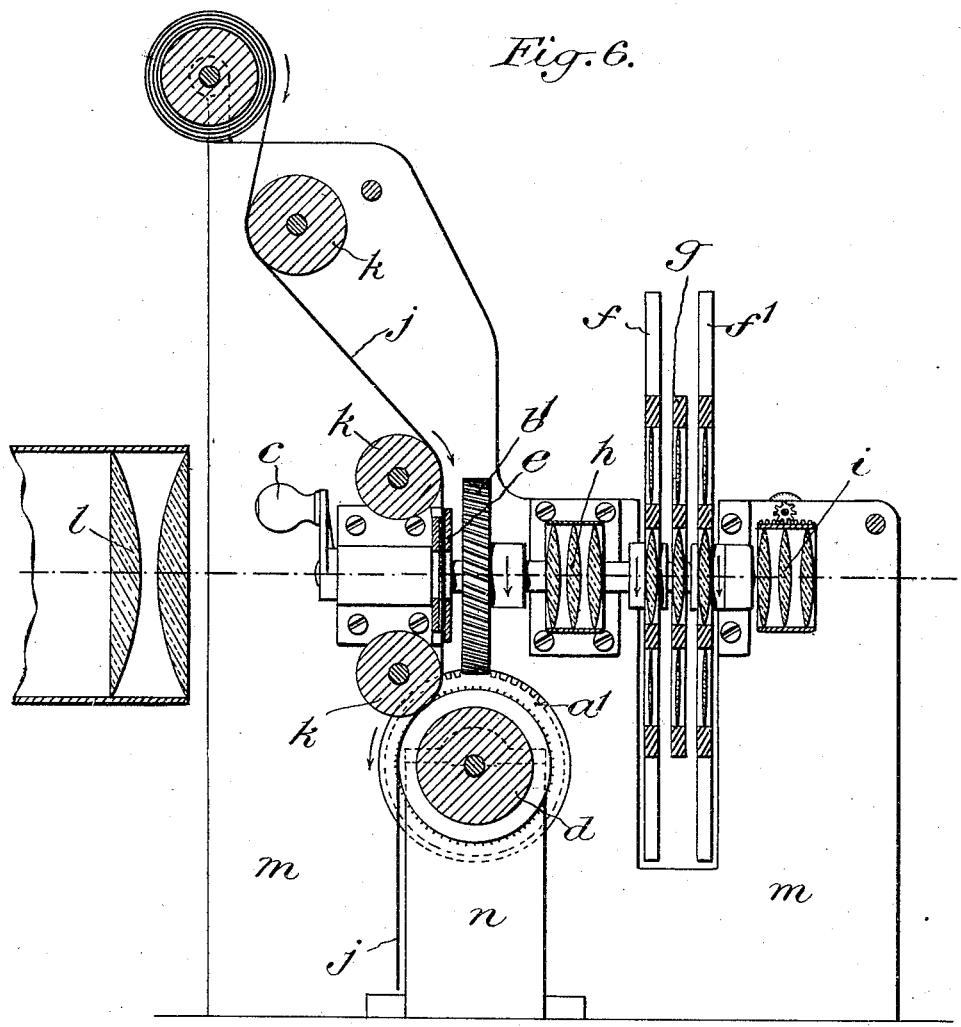

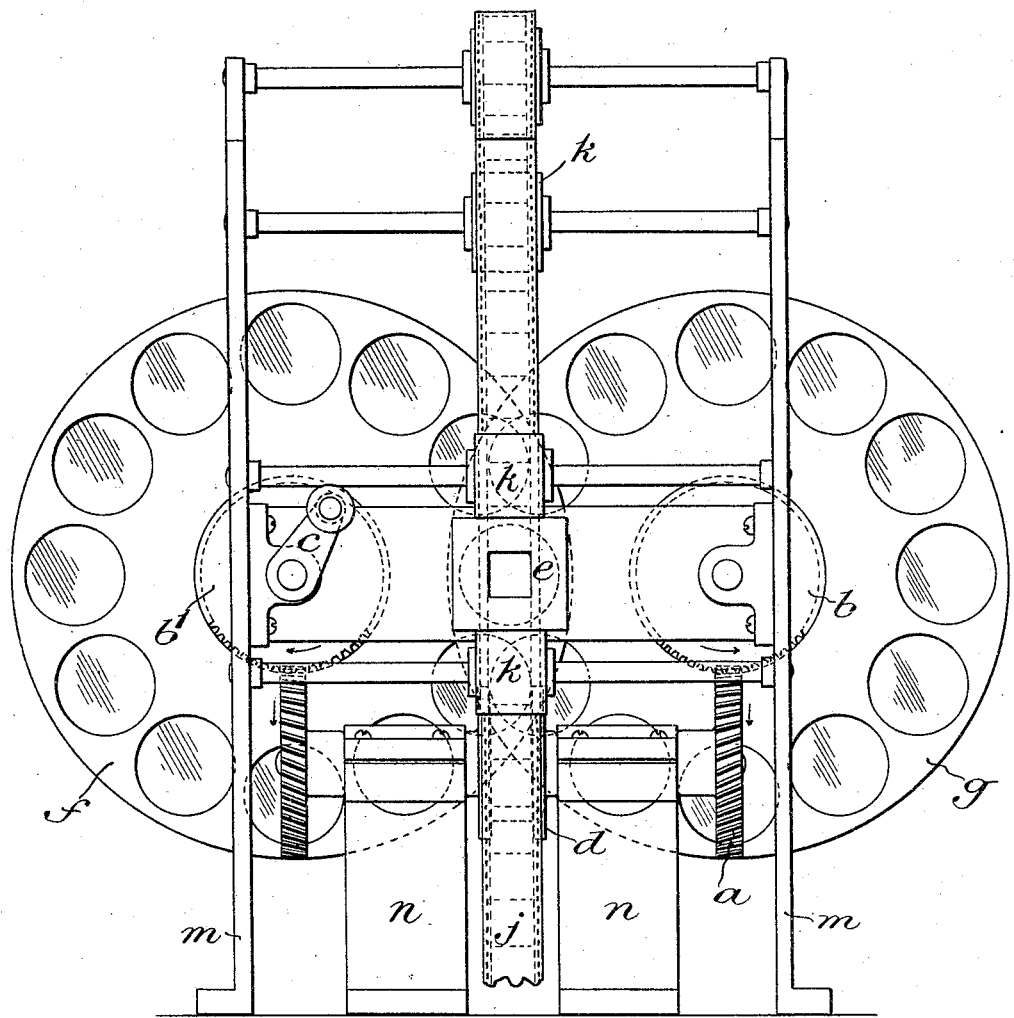

No. 775,000. Patented November 15, 1904.

UNITED STATES PATENT OFFICE.

ALFRED EMILE EDMOND BREARD, OF PARIS, FRANCE.

OBJECTIVE FOR KINEMATOGRAPHIC OR LIKE PROJECTIONS.

SPECIFICATION forming part of Letters Patent No. 775,000, dated November 15, 1904.

Application filed February 26, 1903. Serial No. 145,158. (No model.)

*To all whom it may concern:*

Be it known that I, ALFRED EMILE EDMOND BREARD, banker, a citizen of the Republic of France, and a resident of 19 Boulevard Walesherbet, Paris, France, have invented a new and useful Improved Objective for Kinematographic or Like Projections, of which the following is a specification.

Every properly-made objective ought, as is known, to include several lenses parallel with each other, and the displacement of one or more of these lenses brings about a corresponding displacement of the image.

In order to make stationary the image of a succession of objects, such as kinematographic views having a continuous movement, and for obtaining also dissolving images, I have conceived the plan of displacing certain of the lenses composing the objective, while keeping them parallel with each other, by causing them to move around two axes situated equidistantly from the optical axis of the fixed part of the objective parallel to this axis and in the same plane therewith.

In the accompanying drawings, Figures 1, 2, 3, 4, and 5 are diagrams, which will be hereinafter explained, illustrating the principle of my invention. Figs. 6 and 7 illustrate an operative structure embodying the invention, Fig. 6 representing a vertical section in a plane passing through the optical axis of the apparatus, and Fig. 7 an elevation as viewed from the left of Fig. 6.

Referring first to the diagrams Figs. 1, 2, 3, 4, 5, consider an objective placed between an object $a\ b$ and its image $a'\ b'$ received on a screen $c$, Fig. 1, such objective being composed of fixed lenses $d\ e$ and movable lenses $f\ g\ g'$, the focal length of the combined lenses $g\ g'$ being equal to the focal length of the lens $f$. If $f$ revolves about the axis $x$, Fig. 2, and if $g\ g'$ revolve together in the opposite direction around the axis $y$, each system describing the same circular arc, the image $a'\ b'$, Fig. 1, will be correspondingly displaced on the screen. The displacement thus obtained will evidently be the resultant of the displacements produced by each of the revolving-lens systems considered separately. Now one of the systems taken by itself would produce on the screen a displacement in the arc of a circle and the other a displacement equally in the arc of a circle, but in the opposite sense. These two circular arcs have a single point in common when all the lenses of the objective have a common optical axis. They are then touching. They have the same radius, as being the deviation of a luminous ray by movable systems having the same focal length turning around two centers equidistant from the optical center. Finally, they are equal when the rotations of the lenses which have produced them are themselves equal. The resultant of the combined action of the two systems will then be a straight line $z\ z'$, Fig. 3—that is to say, the rays will be deviated vertically without suffering any lateral deviation.

It will be understood that if the object the image of which is projected on the screen by the objective is displaced in a line perpendicular to the plane of the axes $x$ and $y$ of the systems of revolving lenses it is possible to keep the image stationary by observing the sole condition that the speed of revolution of the lenses $f$ and $g\ g'$ should be suitably regulated—that is to say, it ought to take the same time for one image and one sector to pass wholly by the optical axis, and if instead of a single object it is desired to project the images of a series of objects—such as kinematograph views, for example—it is sufficient that a series of lenses should be arranged around the axes $x\ y$ so as to make complete wheels, Fig. 4, in order to obtain the projection of the images of the objects at a fixed point on the screen.

It will be observed that the arrangement described above has the advantage of having a continuous movement. It has, moreover, the advantage that dissolving views are obtained as one view passes into the other, provided that for the revolving systems there are used lenses $f\ g\ g'$ of smaller diameter than that of the fixed lenses $d\ e$ in such a manner that each sector of the revolving lenses corresponds with a view, while the fixed system is of sufficient dimensions to combine the effect of several revolving sectors at the same time. In this way the images are superimposed on the screen, as shown diagrammatically in Fig. 5, each increasing or diminishing in brilliancy in proportion as it approaches or recedes from the optical axis of the fixed system, and consequently each image is successively viewed with the maximum brilliancy by the spectator at the moment when the object which produces it passes the level of this axis.

It is obvious that instead of projecting the images on a screen they may be regarded directly through an eyepiece. Moreover, the number of the movable lenses and that of the fixed lenses may evidently be varied, the duplication of one of the systems of movable lenses consisting of two lenses $g$ $g'$, placed one on each side of the lens $f$, which constitutes the other movable system, is only to correct the effects of the difference in position of the two movable systems from that of the fixed system.

The film or transparent band $j$, carrying the images, advances with a continuous movement, being driven by teeth or points or projections on the two extremities of the roller $b$, which points enter into holes pierced in the edges of the band. This latter is guided by rollers $k$ $k$. The drum $d$ has the diameter desired for displacing the band $j$ the length of twelve images, during which the wheels or rotary carriers $f$ $f'$ $g$ make one revolution, and as each of these wheels is furnished with twelve lenses it may be seen that a new lens acts for each image. The advancing movement of the film $j$ and the rotative movement of the wheels furnished with lenses are given by a crank $c$ and spiral gear-wheels $a$ $a'$ and $b$ $b'$. The band passes between fixed guides $e$. The wheel $g$ is fixed upon a shaft, and the wheels $f$ and $f'$ are fixed together upon a second shaft parallel with the first and situated like it at the height of the optical axis of the apparatus. If one of these elements $f$ $g$ is thus divided into two, $f$ $f'$, it is for the purpose of avoiding deformation of the defective images, owing to which the lens of the wheel $f$ being in front of the lens of the wheel $g$ those of $f'$ are, on the contrary, behind it.

$h$ and $i$ are the compound objectives such as are well known. In this example there is one objective in front of the lens-wheels and one in rear thereof; but this is not indispensable. There should be at least one to bring back into the axis of the apparatus the rays which have traversed the wheels, the latter not being in the axis, but to the right and left of it, respectively.

$l$ is the condenser with which the illuminating-lantern is furnished to parallelize the luminous rays. $m$ $m$ and $n$ $n$ are supports.

What I claim as my invention is—

1. An objective for kinematographic and like projection composed of fixed lenses, two systems of revolving lenses, two rotary carriers for said revolving lenses and means for producing the rotary movement of said carriers in opposite directions, said revolving lenses being arranged in circles around the axes of their respective carriers and the axes of the carriers being parallel with and equidistant from the optical axis of the fixed lenses while the three axes are in the same plane and the optical axis of the several lenses is perpendicular to the direction of the movement of the objects the images of which are to be projected by the objective, substantially as herein described.

2. An objective composed of fixed lenses and two systems of revolving lenses having their optical axes and their axes of revolution equidistant from and parallel with the optical axis of the fixed lenses, one of said systems of revolving lenses being divided into two parts, one of said parts being arranged in front and the other behind the other of said systems, substantially as herein described.

In testimony that I claim the foregoing as my invention I have signed my name, in presence of two witnesses, this 14th day of February, 1903.

ALFRED EMILE EDMOND BREARD.

Witnesses:
J. ALLISON BOWEN,
ALCIEDE FABE.